US011429796B2

(12) United States Patent
Huynh et al.

(10) Patent No.: US 11,429,796 B2
(45) Date of Patent: Aug. 30, 2022

(54) METHOD AND APPARATUS FOR VIRTUALLY WRITING TO A NFC CHIP

(71) Applicant: Galatea Technology LLC, San Dimas, CA (US)

(72) Inventors: Chi Huynh, San Dimas, CA (US); Alexey Galishnikov, Bryohovo (RU)

(73) Assignee: GALATEA TECHNOLOGY, LLC, San Dimas, CA (US)

( * ) Notice: Subject to any disclaimer, the term of this patent is extended or adjusted under 35 U.S.C. 154(b) by 229 days.

(21) Appl. No.: 15/944,083

(22) Filed: Apr. 3, 2018

(65) Prior Publication Data

US 2019/0122010 A1 Apr. 25, 2019

Related U.S. Application Data

(60) Provisional application No. 62/575,028, filed on Oct. 20, 2017.

(51) Int. Cl.
| | |
|---|---|
| *G06K 7/00* | (2006.01) |
| *G06K 7/10* | (2006.01) |
| *H04W 4/80* | (2018.01) |
| *G06K 17/00* | (2006.01) |
| *G06K 19/07* | (2006.01) |

(52) U.S. Cl.
CPC ....... *G06K 7/0008* (2013.01); *G06K 7/10237* (2013.01); *G06K 17/0029* (2013.01); *H04W 4/80* (2018.02); *G06K 19/0723* (2013.01)

(58) Field of Classification Search
CPC ............. G06K 7/0008; G06K 7/10237; G06K 17/0029; G06K 19/0723; H04W 4/80
See application file for complete search history.

(56) References Cited

U.S. PATENT DOCUMENTS

| | | | | | |
|---|---|---|---|---|---|
| 6,134,597 | A | * | 10/2000 | Rieth | ...................... H04L 69/22 709/217 |
| 2012/0077593 | A1 | * | 3/2012 | Sarmenta | .............. A63F 13/327 463/40 |
| 2013/0303085 | A1 | * | 11/2013 | Boucher | ................. H04W 4/80 455/41.1 |

(Continued)

OTHER PUBLICATIONS

International Search Report dated Jun. 20, 2018 for International Application No. PCT/US18/25899.

*Primary Examiner* — Curtis A Kuntz
(74) *Attorney, Agent, or Firm* — Tutunjian & Bitetto, P.C.

(57) ABSTRACT

Computer-implemented methods, computer program products, and systems are provided for performing Near Field Communication (NFC) communication with a first NFC device that includes a NFC writable component and an operating system that restricts writing to the NFC writable component and allows reading NDEF messages from a source other than the NFC writable component. A method includes receiving, by a remote server, a serial number of the NFC writable component. The method further includes generating, by the remote server, a unique ID based on the serial number. The method also includes storing, by the remote server, the unique ID with a name of the NFC writable component. The method additionally includes preparing and sending, by the remote server, a Near Field Communication Data Exchange Format (NDEF) message to the NFC device that includes the unique ID together with information to be shared with a user of the NFC device.

25 Claims, 14 Drawing Sheets

(56) References Cited

U.S. PATENT DOCUMENTS

| | | | |
|---|---|---|---|
| 2014/0289832 A1* | 9/2014 | Rosenberg | H04L 49/9063 |
| | | | 726/7 |
| 2016/0021091 A1* | 1/2016 | Hoyer | H04W 12/08 |
| | | | 726/9 |
| 2016/0112097 A1* | 4/2016 | Huynh | H04B 5/0056 |
| | | | 455/41.1 |
| 2017/0017947 A1* | 1/2017 | Robinton | G06Q 20/40 |
| 2018/0096123 A1* | 4/2018 | Shibata | H04N 1/00342 |

* cited by examiner

METHOD AND APPARATUS FOR VIRTUALLY WRITING TO A NFC CHIP

RELATED APPLICATION INFORMATION

This application claims priority to U.S. Provisional Application Ser. No. 62/575,028, filed on Oct. 20, 2017, incorporated herein by reference herein its entirety.

BACKGROUND

Technical Field

The present invention relates generally to Near Field Communication (NFC) devices, and more particularly to a method and apparatus for virtually writing to a NFC chip of a NFC device that is controlled by an operating system which prevents writing to the NFC chip.

Description of the Related Art

Near field communication (NFC) is a more finely honed version of Radio-Frequency Identification (RFID). NFC generally operates within a maximum range of about 4-10 cm and can operate in one-way or two-way communications. NFC communication involves the modulation of an electric field or a magnetic field. NFC-enabled features are now commonly integrated into smart phones. This technology is being adopted for financial transactions where touching a NFC smart phone to a NFC checkout terminal instructs payment, thereby replacing credit cards. In addition, data can be shared directly between NFC smartphones by just tapping the phones together. NFC has also been adapted for mobile payments or sharing data between NFC devices. The NFC Data Exchange Format (NDEF) is a standardized data format that can be used to exchange information between any compatible NFC device and another NFC device or tag. The data format includes NDEF Messages and NDEF Records tags.

Recent developments NFC relate to the implementation of NFC chips in all kinds of devices (e.g., jewelry) and the ability of a smartphone to read such NFC devices (i.e., NDEF tags/NFC chips). By way of example, Apple® recently opened its NFC technology, which allows developers to make applications that can read NFC devices. In the new operating system iOS 11, there is a NFC Application Programming Interface (API) library called "Core NFC". This API library can be used to read NDEF tags, for example on iPhone® 7 and iPhone® 7 plus and later models (generically referred to herein as an "iOS device" or "iOS NFC device"). However, due to the iOS operating systems, you cannot use this library, and no other libraries, to specifically write on NDEF tags/NFC Chips for the iOS device. In addition, with this library (and the iOS operating system), there is no way to read the NFC chip system information such as its serial number. Hence, there is a need for an approach for writing to a NFC chip.

SUMMARY

According to an aspect of the present invention, a computer-implemented method is provided for performing Near Field Communication (NFC) communication with a first NFC device that includes a NFC writable component and an operating system that restricts writing to the NFC writable component and allows reading NDEF messages from a source other than the NFC writable component. The method includes receiving, by a remote server, a serial number of the NFC writable component. The method further includes generating, by the remote server, a unique ID based on the serial number. The method also includes storing, by the remote server, the unique ID with a name of the NFC writable component. The method additionally includes preparing and sending, by the remote server, a Near Field Communication Data Exchange Format (NDEF) message to the NFC device that includes the unique ID together with information to be shared with a user of the NFC device.

According to another aspect of the present invention, a system is provided for performing Near Field Communication (NFC) communication with a first NFC device that includes a NFC writable component and an operating system that restricts writing to the NFC writable component and allows reading NDEF messages from a source other than the NFC writable component. The system includes a remote server. The remote server is configured to receive, a serial number of the NFC writable component. The remote server is further configured to generate a unique ID based on the serial number. The remote server is also configured to store the unique ID with a name of the NFC writable component. The remote server is additionally configured to prepare and send a Near Field Communication Data Exchange Format (NDEF) message to the NFC device that includes the unique ID together with information to be shared with a user of the NFC device.

According to yet another aspect of the present invention, a computer-implemented method is provided for performing Near Field Communication (NFC) with a NFC device that includes a NFC writable component and an operating system that restricts writing to the NFC writable component and allows reading NDEF messages from a source other than the NFC writable component. The method includes receiving, by a remote server, a serial number of the NFC writable component. The method further includes generating, by the remote server, a unique ID based on the serial number. The method also includes storing, by the remote server, the generated unique ID with a name of the NFC writable component. The method additionally includes preparing and sending, by the remote server to the NFC device, an NDEF message that includes the unique ID. The method further includes selectively storing to or retrieving from, the remote server, data using the unique ID included in the NDEF message as an index for data storage or data retrieval, respectively.

According to still another aspect of the present invention, a system is provided for performing Near Field Communication (NFC) with a NFC device that includes a NFC writable component and an operating system that restricts writing to the NFC writable component and allows reading NDEF messages from a source other than the NFC writable component. The system includes a remote server. The remote server is configured to receive a serial number of the NFC writable component. The remote server is further configured to generate a unique ID based on the serial number. The remote server is also configured to store the generated unique ID with a name of the NFC writable component. The remote server is additionally configured to prepare and send, to the NFC device, an NDEF message that includes the unique ID. The remote server is further configured to selectively store or retrieve data using the unique ID included in the NDEF message as an index for data storage or data retrieval, respectively.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
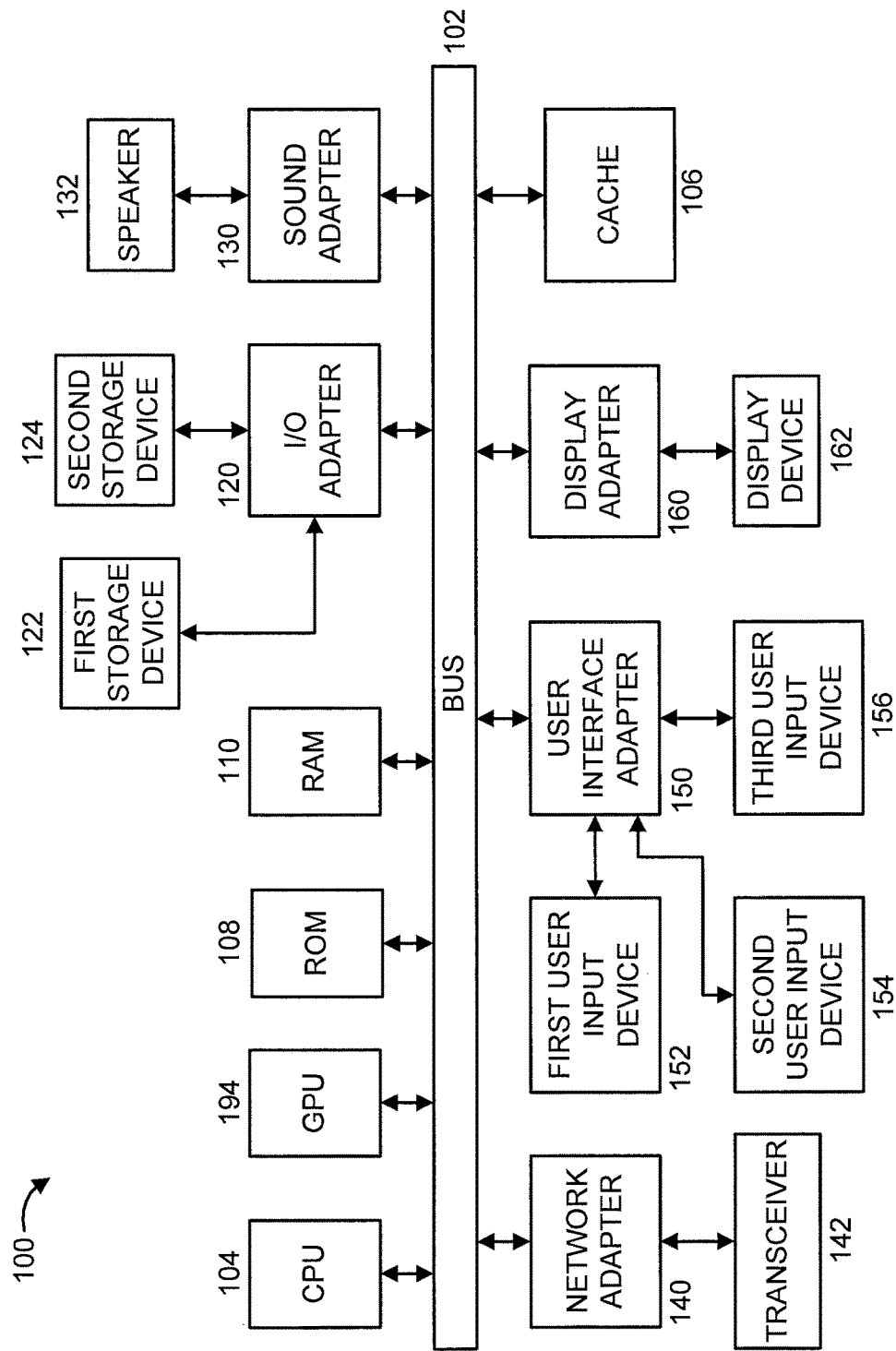
FIG. 1 is a block diagram showing an exemplary processing system to which the present invention may be applied, in accordance with an embodiment of the present invention.

The present invention is directed to a method and apparatus for virtually writing to a NFC writable component in a NFC device having an Operating System (OS) which prevents access and writing to the NFC writable component.

In an embodiment, the present invention can be used to read a NFC chip serial number and then use that serial number as an index to write data to (and read data from) a remote server/database. The remote server/database can store recordings for multiple NFC devices for one or more users based on the serial numbers of NFC chips (or tags) in the multiple NFC devices. In this way, current limitations on certain devices, as mentioned above, can be overcome, as well as inherent memory limitations of prior art approaches limited to storing recordings on the limited memory of the NFC chip itself. These and other advantages of the present invention are readily apparent to one of ordinary skill in the art, given the teachings of the present invention provided herein, while maintaining the spirit of the present invention.

In one or more embodiments of the present invention can involve a "NFC device with unrestricted NFC capability", an "OS with unrestricted NFC capability", a "NFC device with restricted NFC capability", and/or an "OS with restricted NFC capability".

As used herein, the term "OS with unrestricted NFC capability" refers to an OS that can read and write NFC information. In an embodiment, NFC information that can be read can include, for example, but is not limited to, a serial number of a NFC writable component. The NFC writable component can be, for example, but is not limited to, a NFC chip or a Near Field Communication Data Exchange Format (NDEF) tag resident on a NFC chip.

As used herein, the term "NFC device with unrestricted NFC capability" refers to a NFC device that includes the OS with unrestricted NFC capability and that can further include the NFC writable component. In an embodiment, the NFC device with unrestricted NFC capability can be, for example, but is not limited to, an Android®-based device. The Android®-based device can be, for example, but is not limited to, a smartphone, a tablet, a computer, a media player, and so forth. Of course, other devices having an OS with unrestricted NFC capability can also be used, while maintaining the spirit of the present invention.

As used herein, the term "OS with restricted NFC capability" refers to an OS that cannot read or write NFC information except for being able to read NDEF messages. In an embodiment, such an OS cannot read a serial number from a NFC chip or write to a NDEF tag on the NFC chip.

As used herein, the term "NFC device with restricted NFC capability" refers to a NFC device that includes the OS with restricted NFS capability. In an embodiment, the NFC device with restricted NFC capability can be, for example, but is not limited to, an "i-device". The "i-device" can be, for example, but is not limited to, an iPhone®, an iPad®, an iPod®, an iMac®, and so forth. Of course, other devices having an OS with restricted NFC capability can also be used, while maintaining the spirit of the present invention.

In an embodiment, the present invention can provide the ability to send messages and share information by writing to a NFC writable device/component such as a passive NFC chip and/or NDEF tag. In an embodiment, the present invention can provide the ability to virtually write to a NFC chip and/or NDEF tag of an iOS device such that messages and other information can be tagged or associated with the NFC chip/NDEF tag of the specific NFC device that includes the same, and such that the user of the iOS device can access the messages and other information.

Figure 3:
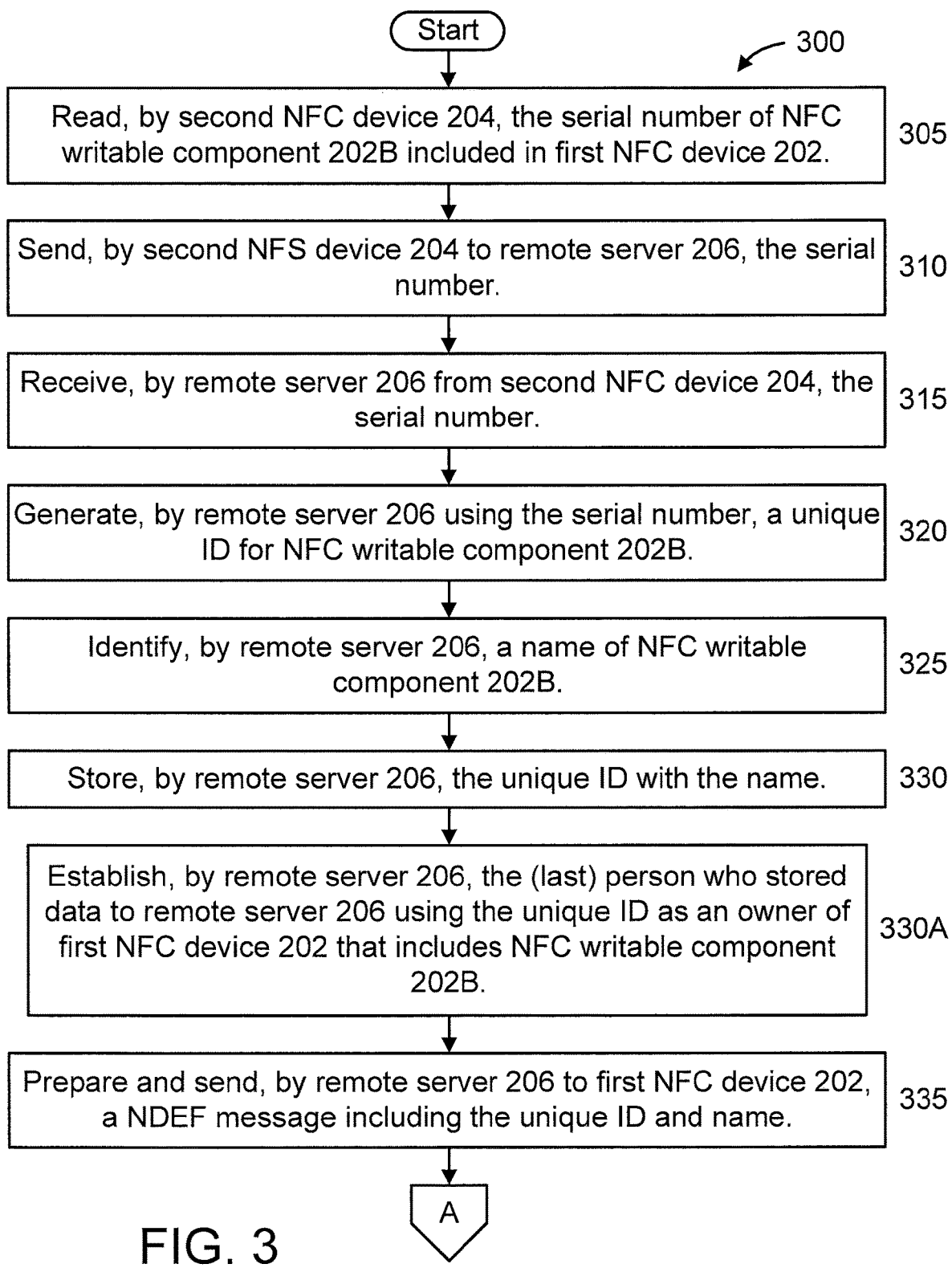
FIGS. 3-4 are flow diagrams showing an exemplary method for programming a NFC writable component to enable virtual writing thereto, in accordance with an embodiment of the present invention.
Figure 4:
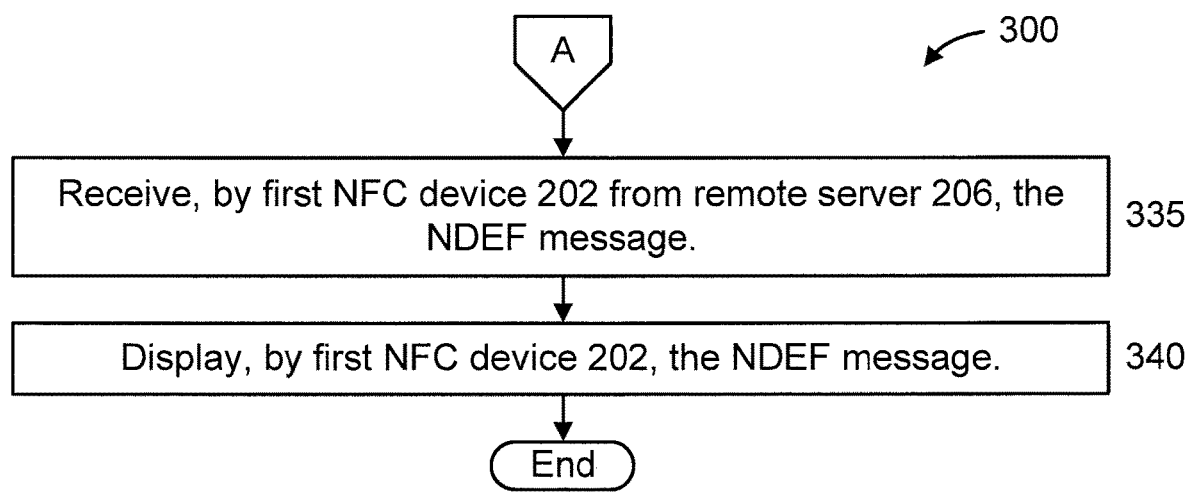

In an embodiment, the present invention can involve preparing a NFC chip so it can be read using a NFC device with restricted NFC capability (i.e., an Apple® device) (see, e.g., FIGS. 3-4).

Figure 5:
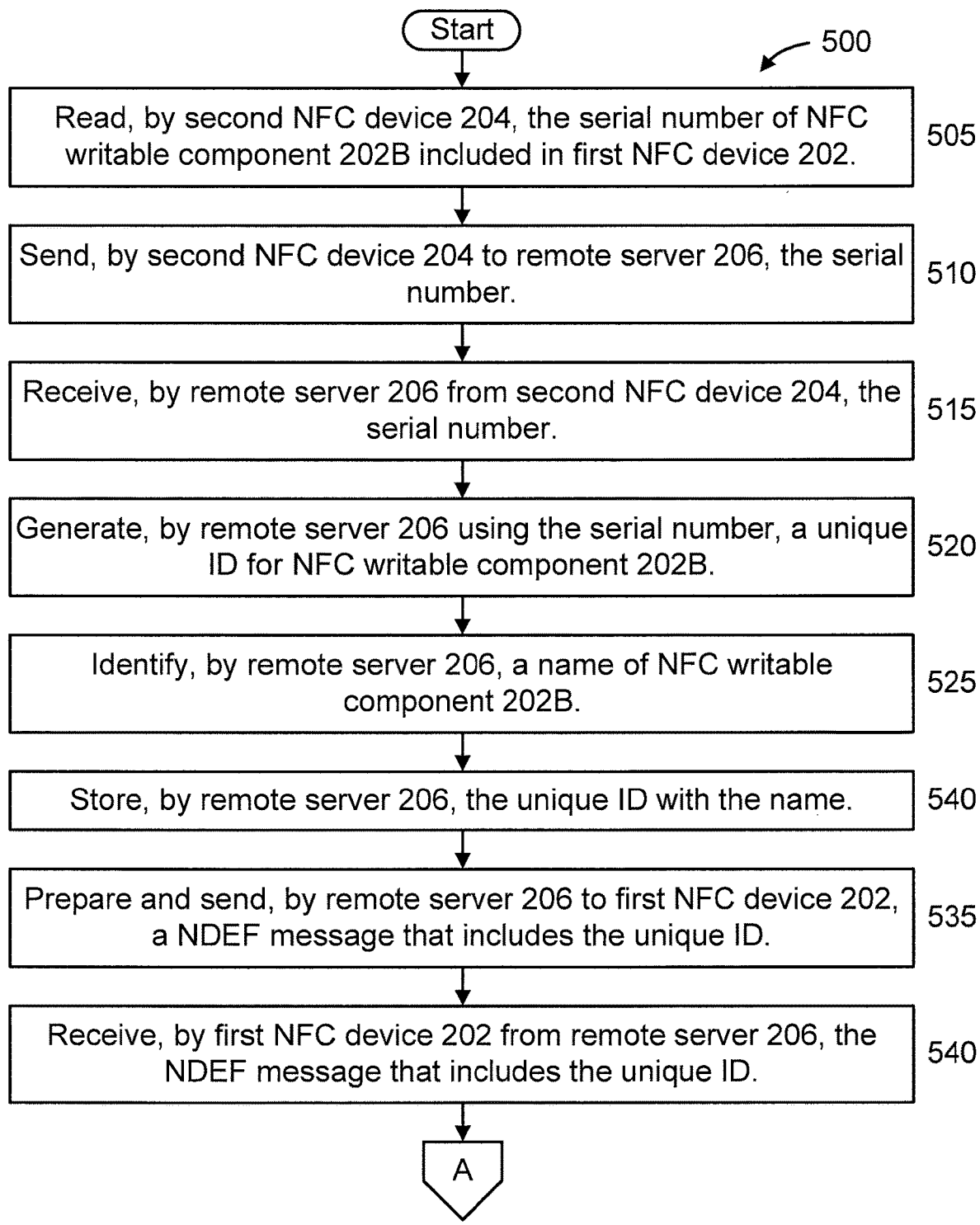
FIGS. 5-6 are flow diagrams showing an exemplary method for virtually writing to a NFC writable component of a NFC device, in accordance with an embodiment of the present invention.

In an embodiment, the present invention can involve virtually writing to a NFC chip with a NFC device with restricted NFC capability (i.e., an Apple® device) (see, e.g., FIGS. 4-5).

U.S. Pat. No. 9,444,524, issued on Sep. 13, 2016, the disclosure of which is incorporated by reference herein in its entirety, is directed to the use of gemstones with embedded near field communication chips for communication with NFC enabled devices. The present invention expands upon the concepts presented in the aforementioned patent as well as provides new concepts for enabling the use of NFC on devices that are configured by their manufacturer and/or are otherwise limited in their ability to write to NFC writable components. These and other features of the present invention are readily determined by one of ordinary skill in the art, given the teachings of the present invention provided herein.

FIG. 1 is a block diagram showing an exemplary processing system 100 to which the present invention may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
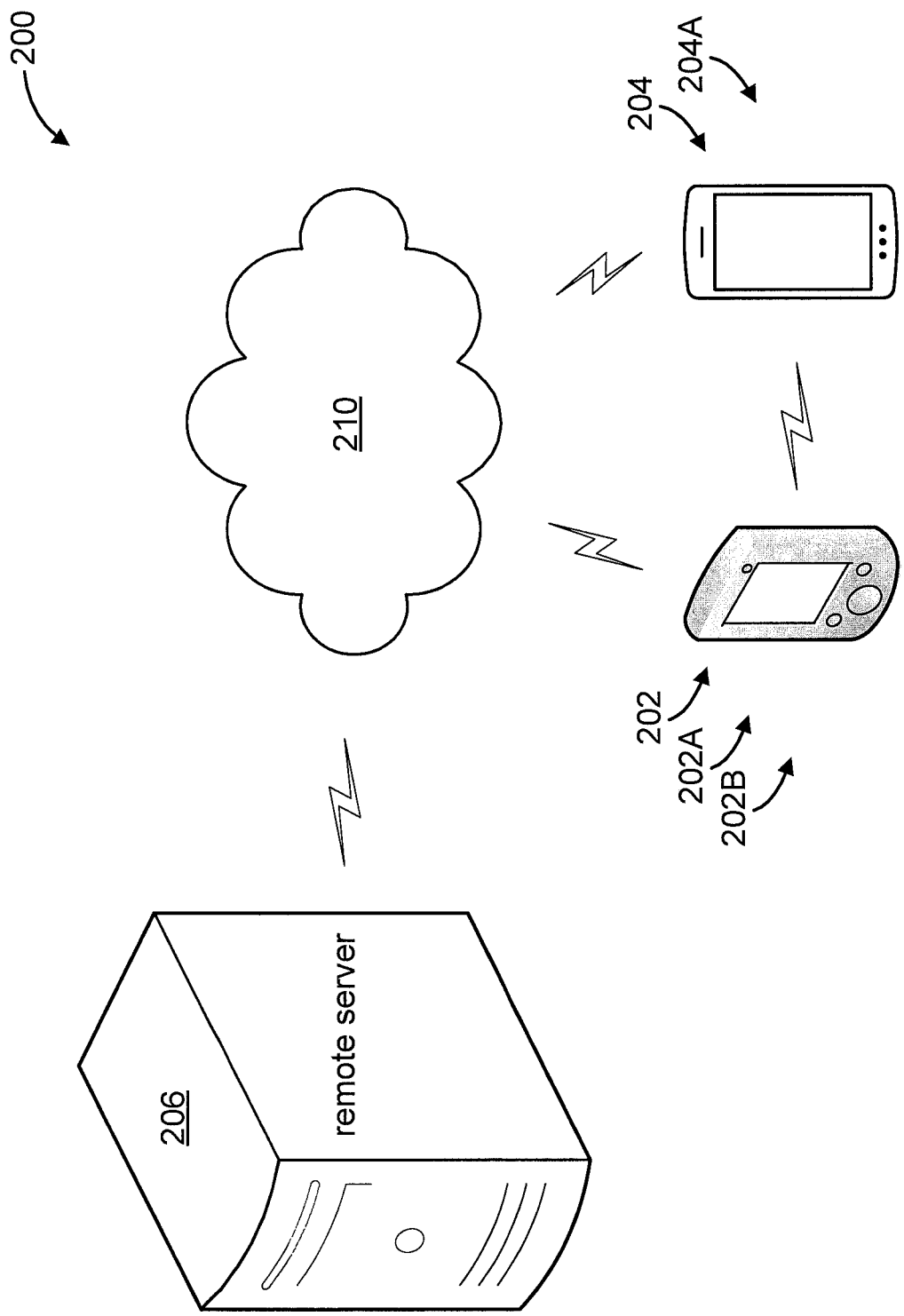
FIG. 2 is a block diagram showing an exemplary system for NFC communications to which the present invention can be applied, in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 6:
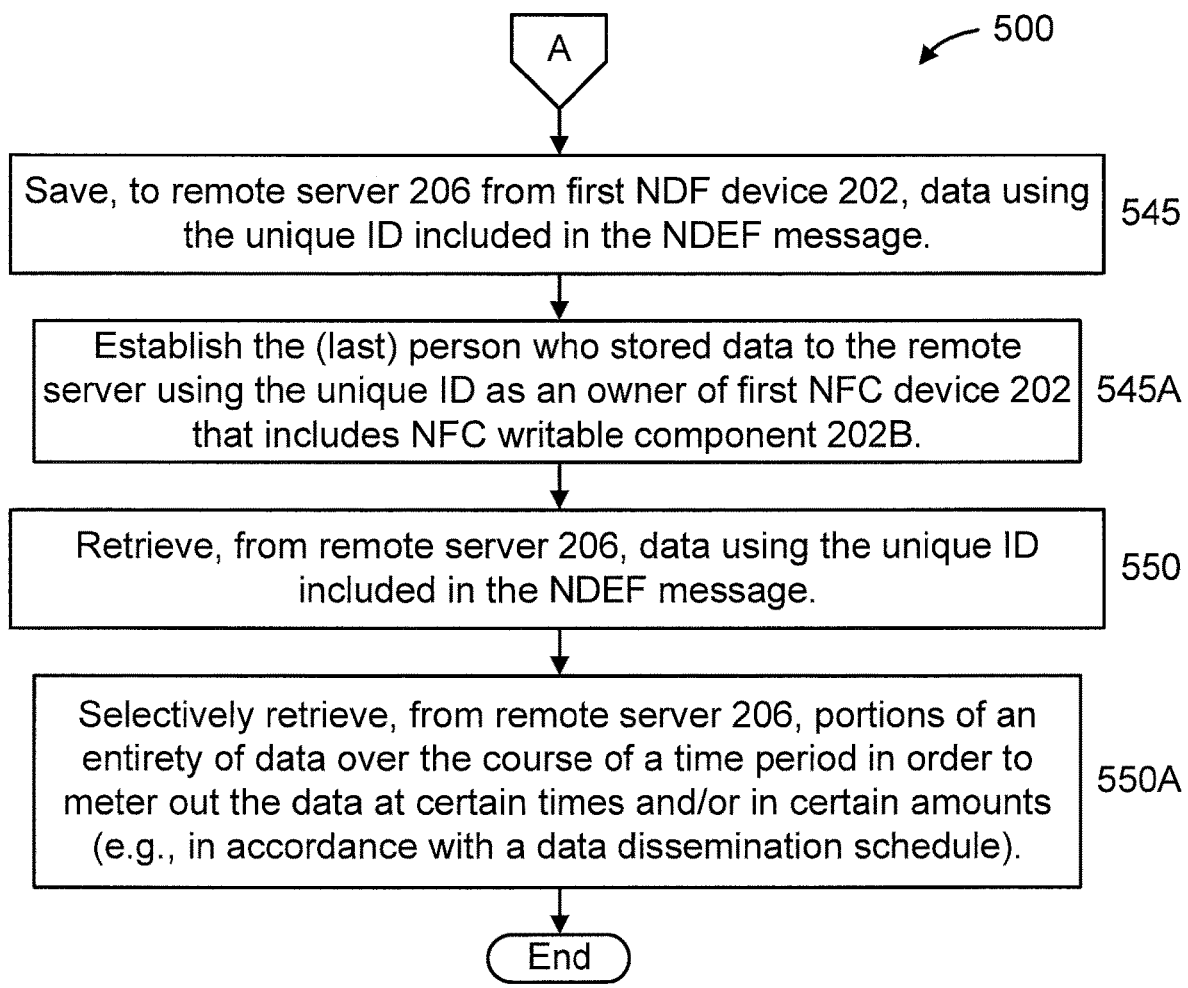

Further, it is to be appreciated that processing system 100 may perform at least part of the method described herein including, for example, at least part of method 300 of FIGS. 3-4 and/or at least part of method 500 of FIGS. 5-6. Similarly, part or all of system 200 may be used to perform at least part of method 300 of FIGS. 3-4 and/or at least part of method 500 of FIGS. 5-6.

FIG. 2 is a block diagram showing an exemplary system 200 for NFC communications to which the present invention can be applied, in accordance with an embodiment of the present invention.

System 200 includes a first NFC device 202, a second NFC device 204, a remote server 206, and one or more networks (hereinafter "network" in short) 210.

First NFC device 202 includes an OS with restricted NFC capability (e.g., an iOS) 202A and a NFC writable component 202B.

In an embodiment, the NFC writable component 202B can be, for example, a NFC chip or a NFED tag resident on and/or operatively coupled to a NFC chip. Of course, other components capable of being written to using NFC can also be used as NFC writable component 202B, while maintaining the spirit of the present invention.

Second NFC device 204 includes an OS with restricted NFC capability (e.g., an Android OS) 204A.

The network 210 can include one or more networks. The one or more networks can involve any communication technology. In an embodiment, at least part of network 210 can be cloud-based.

First NFC device 202 and second NFC device 204 are capable of communicating with each other using NFC. Moreover, first NFC device and second NFC device 204 can communicate with remote server 206 via network 210.

Further descriptions of the elements of system 200 are provided below, at least with respect to method 300 and method 500 FIGS. 3-4 and 5-6, respectively. Method 300 is performed to enable virtual writing in accordance with the present invention, and method 500 involves the actual virtual writing in accordance with the present invention.

FIGS. 3-4 are flow diagrams showing an exemplary method 300 for programming a NFC writable component to enable virtual writing thereto, in accordance with an embodiment of the present invention. For the sake of illustration, method 300 will be described relative to the elements of system 200. However, as appreciated by one of ordinary skill in the art, system 200 as well as variations thereof as well as other NFC-based systems altogether can also be used in accordance with the teachings of the present invention, while maintaining the spirit of the present invention.

It is to be appreciated that in an embodiment, such programming in accordance with method 300 can serve as a registration process that enables a user to establish ownership of the NFC object (e.g., a NFC gem, etc.) that includes the NFC writable component. In such a case, in an embodiment, the last person to write a new message/data to the remote server 206 can be considered the actual owner of the NFC object that includes the NFC writable component.

At block 305, read, by second NFC device 204, the serial number of NFC writable component 202B included in first NFC device 202.

At block 310, send, by second NFS device 204 to remote server 206, the serial number.

At block 315, receive, by remote server 206 from second NFC device 204, the serial number. The serial number can be sent over at least part of network 210.

At block 320, generate, by remote server 206 using the serial number, a unique ID for NFC writable component 202B. The unique ID can generated, for example, using a hash function, and/or so forth. For example, a hash function can be applied to the serial number in order to obtain the unique ID.

At block 325, identify, by remote server 206, a name of NFC writable component 202B. The name can be identified based on the serial number and/or user supplied. For example, the name can be selected by the user to correspond to a particular application, gem, user, company, person, and/or any other object or entity. Other sources for the name can also be used. In this embodiment, the name is used as it can be more readily remembered by a user than a serial number or a hash of a serial number (e.g., the unique ID). In this way, particularly in the case of multiple gems, the user can readily recall their names from the user's gem library (see, e.g. FIG. 8 below), as opposed to using serial numbers or hashes.

At block 330, store, by remote server 206, the unique ID with the name.

In an embodiment, block 330 can include block 330A.

At step 330A, establish, by remote server 206, the (last) person who stored data to the remote server 206 using the unique ID as an owner of first NFC device 202 that includes NFC writable component 202B. Hence, for an initial programming, the person to store data can be considered the owner.

At block 335, prepare and send, by remote server 206 to first NFC device 202, a NDEF message including the unique ID and name. In an embodiment, the NDEF message is sent via network 210.

At block 340, receive, by first NFC device 202 from remote server 206, the NDEF message.

At block 345, display, by first NFC device 202, the NDEF message.

FIGS. 5-6 are flow diagrams showing an exemplary method 500 for virtually writing to a NFC writable component of an NFC device, in accordance with an embodiment of the present invention. For the sake of illustration, method 500 will be described relative to the elements of system 200. However, as appreciated by one of ordinary skill in the art, system 200 as well as variations thereof as well as other NFC-based systems altogether can also be used in accordance with the teachings of the present invention, while maintaining the spirit of the present invention.

At block 505, read, by second NFC device 204, the serial number of NFC writable component 202B included in first NFC device 202.

At block 510, send, by second NFC device 204 to remote server 206, the serial number. The serial number can be sent over at least part of network 210.

At block 515, receive, by remote server 206 from second NFC device 204, the serial number.

At block 520, generate, by remote server 206 using the serial number, a unique ID for NFC writable component 202B. The unique ID can generated, for example, using a hash function, and/or so forth. For example, a hash function can be applied to the serial number in order to obtain the unique ID.

At block 525, identify, by remote server 206, a name of NFC writable component 202B. The name can be identified based on the serial number and/or user supplied. For example, the name can be selected by the user to correspond to a particular application, gem, user, company, person, and/or any other object or entity. Other sources for the name can also be used. In this embodiment, the name is used as it can be more readily remembered by a user than a serial number or a hash of a serial number (e.g., the unique ID). In this way, particularly in the case of multiple gems, the user can readily recall their names from the user's gem library (see, e.g. FIG. 8 below), as opposed to using serial numbers or hashes.

At block 530, store, by remote server 206, the unique ID with the name.

At block 535, prepare and send, by remote server 206 to first NFC device 202, a NDEF message that includes the unique ID. In an embodiment, the unique ID is used as an index to the NDEF message stored on remote server 206.

At block 540, receive, by first NFC device 202 from remote server 206, the NDEF message that includes the unique ID.

At block 545, save, to remote server 206 from first NDF device 202, data using the unique ID included in the NDEF message. In an embodiment, the unique ID is used as an index to the data stored on remote server 206.

In an embodiment, step 545 can include step 545A.

At step 545A, establish the (last) person who stored data to the remote server using the unique ID as an owner of first NFC device 202 that includes NFC writable component 202B. Hence, for an initial storing, the person to store data can be considered the owner. However, for any subsequent storing of a new message, the person storing the new message is considered the owner of first NFC device 202 that includes NFC writable component 202B.

At block 550, retrieve, from remote server 206, data using the unique ID included in the NDEF message. In an embodiment, the unique ID is used as an index to the data stored on remote server 206. The data can be stored in a user account associated with and using the unique ID as an index to the user account from among a set of multiple user accounts.

In an embodiment, block 550 can include block 550A.

At block 550A, selectively retrieve, from remote server 206, portions of an entirety of data over the course of a time period in order to meter out the data at certain times and/or in certain amounts (e.g., in accordance with a data dissemination schedule). For example, various chapters in a book, various songs from a compact disc, and so forth can be disseminated to the user at certain times.

A description will now be given regarding a significant advantage provided by one or more embodiments of the present invention.

While it can be envisioned that data such as Uniform Resource Locators (URLs) and short messages can be directly written to a NFC chip using NFC software and retrieved by a NFC device, the current memory capacity of many NFC chips is only about 96 bytes with some up to about 4 kilobytes. Advantageously, the present invention overcomes this limitation by permitting data storage on a remote server. In this way, memory limitations of a NFC chip are readily overcome by the increased storage available on such a remote server. These and other advantages of the present invention are readily apparent to one of ordinary skill in the art, given the teachings of the present invention provided herein.

A description will now be given regarding an exemplary problem to which the present invention can be applied.

In particular, the problem relates to transferring ownership of a NFC gem. However, it is to be appreciated that while a NFC gem is involved in the example, any object capable of including a NFC writable component therein can be used instead, as readily appreciated by one of ordinary skill in the art given the teachings of the present invention provided herein, while maintaining the spirit of the present invention.

To that end, consider the following.

(1) NFC jewelry created by a manufacturer, where the manufacturer will own the gem by registering ownership of the gem (e.g., but not limited to, using an application called Memento).

(2) The manufacturer sold the NFC gem to a retailer. The retailer made one or more recordings to the gem to test the NFC gem in his shop.

(3) A Sale Representative in a retail store made some more recordings to show his customers how the NFC gem works.

(4) A customer bought the NFC gem, made a recording to the NFC gem so he can give the NFC gem to his wife.

(5) His wife plays back the recording and also makes new recordings to add to the NFC gem and the gem's NFC library.

At this point we already have five persons making multiple recordings to this gem. Hence, the question is: "Who is currently the owner of this gem?" If we don't know the owner of the gem, then we do not know who will own the contents of the NFC gem to assign these contents to that user. The person that owns the physical gem cannot be determined without some form of registration or validation process.

Of course, we can ask each person to register in the application and the server before they can write or access the NFC gem but that can be time consuming during a selling process when multiple entities want to test the same gem. To this end, the gem will has numerous unwanted messages before the NFC gem gets to the customer that bought the gem. Therefore, a solution is needed regarding NFC gem ownership in this and other scenarios.

The solution to the preceding problem is to simplify the ownership process. For example, the last person making a recording to the NFC gem will be considered the owner of the NFC gem.

Thus, in an embodiment, the first owner can be the manufacturer.

Hence, the person, company or a user that makes the first recording to the NFC Gem and registers the gem (e.g., on the application, the device, and the cloud) is the first owner. The first message saved to the NFC gem and recorded to the gem's library thus corresponds to the first owner.

Figure 7:
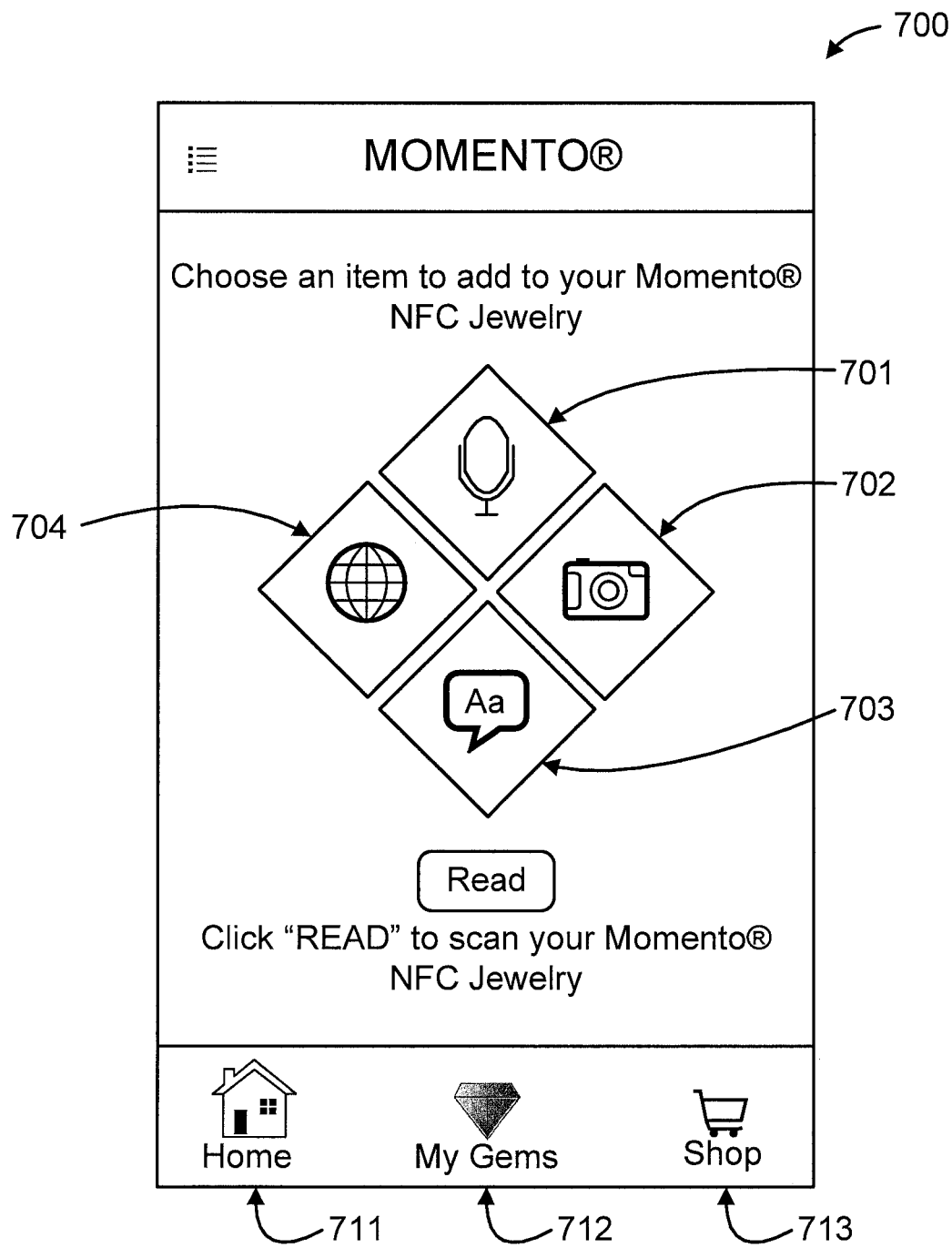
FIG. 7 is an exemplary screenshot of a screen of a NFC device showing a menu for recording a message, in accordance with an embodiment of the present invention.

FIG. 7 is an exemplary screenshot 700 of a screen of a NFC device showing a menu 710 for recording a message, in accordance with an embodiment of the present invention. In such a case, the user of the NFC device opens the Momento® application, and clicks on the microphone icon 701 to record audio messages, or the camera icon 702 to record an image, or the message icon 703 to record a text message, or the web icon 704 to record a Uniform Resource Locator (URL). The recorded item is saved and ready for playback. Menu options can include: "Home" 711; "My Gems" 712; and "Shop" 713.

Figure 8:
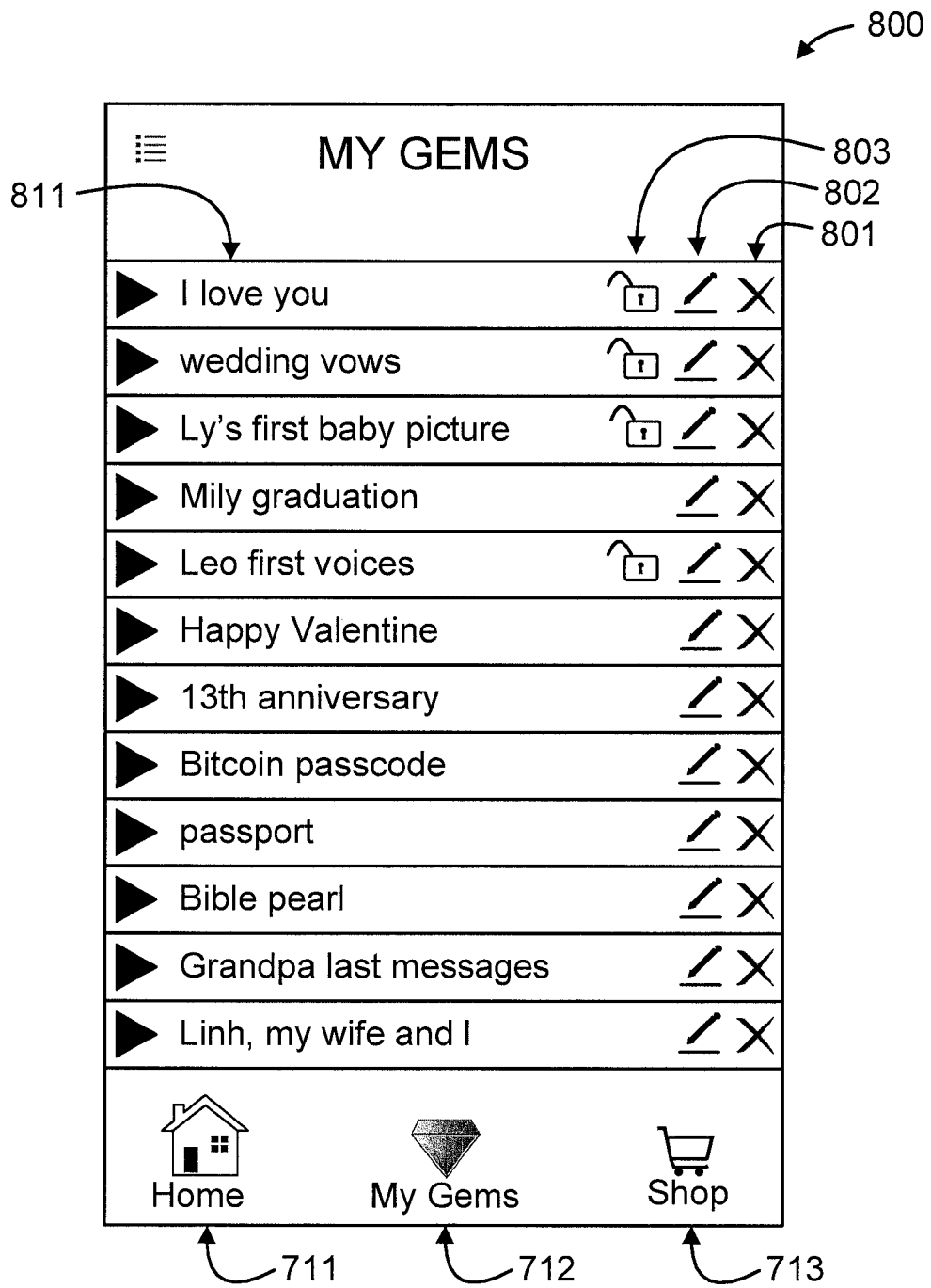
FIG. 8 is an exemplary screenshot of a screen of a NFC device further showing the menu option "My Gems" of FIG. 7, in accordance with an embodiment of the present invention.
Figure 11:
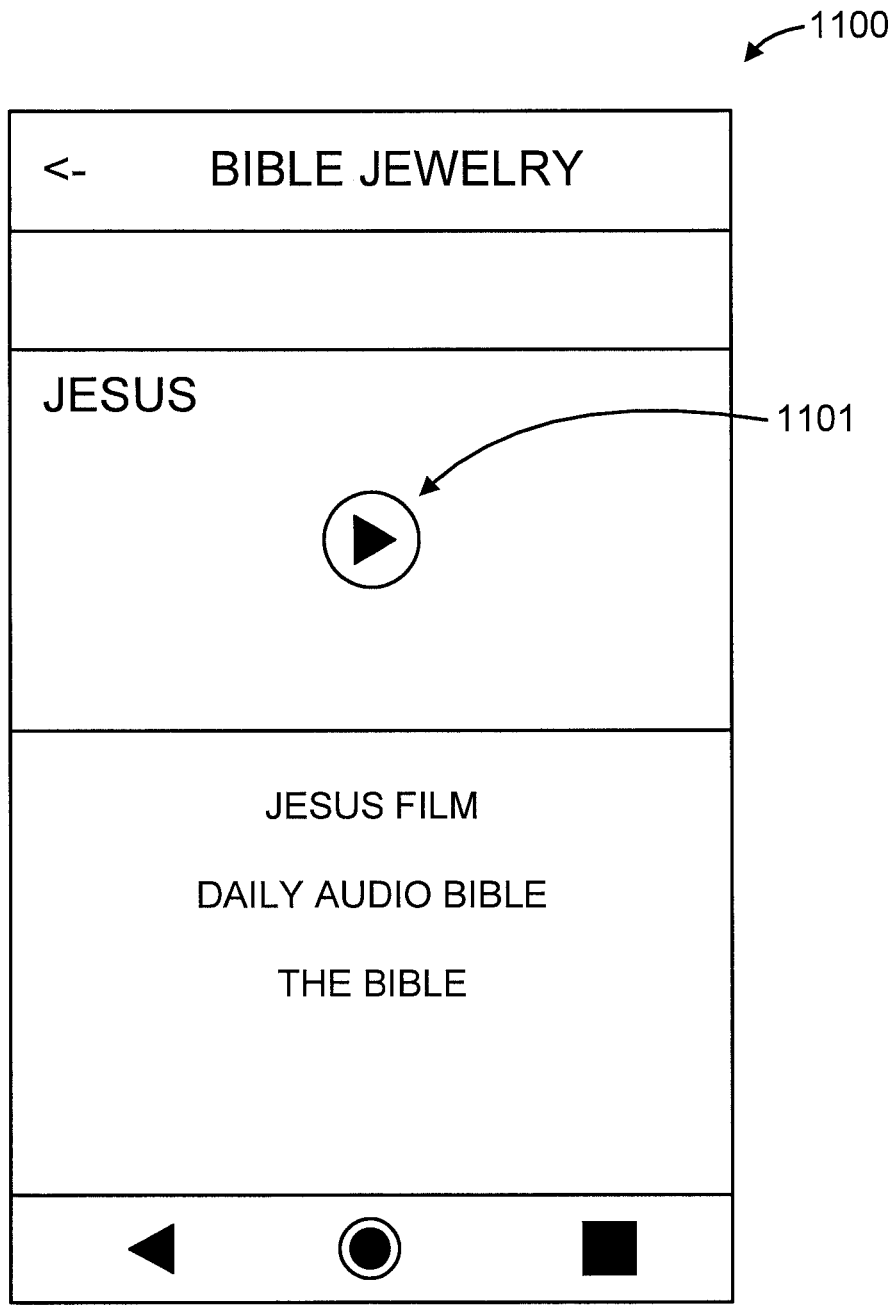
FIG. 11 is an exemplary screenshot of a screen of a NFC device showing options for reproducing a Jesus Film, Daily Audio Bible, and The Bible, in accordance with an embodiment of the present invention.

FIG. 8 is an exemplary screenshot 800 of a screen of a NFC device further showing the menu option "My Gems" of FIG. 7, in accordance with an embodiment of the present invention. Essentially, FIG. 8 shows a user's library that, in turn, shows the gems owned by the user and the recordings for the gems. By selecting the menu option "My Gems", a user is presented with a list 811 of gem names relating to gems of the user. The menu option "My Gems" further includes a delete option 801 for deleting a gem, a name edit option 802 for editing the name of a gem, and a lock option 803 for locking a gem. When a gem is in locked mode, no one else can access the gem. The lock option 803 thus provides a nice security feature to protect recordings. FIG. 11, described in further detail below, shows some control buttons that can be implicated for a recording and used by a user such as, for example, record, playback, stop, and so forth.

Figure 9:
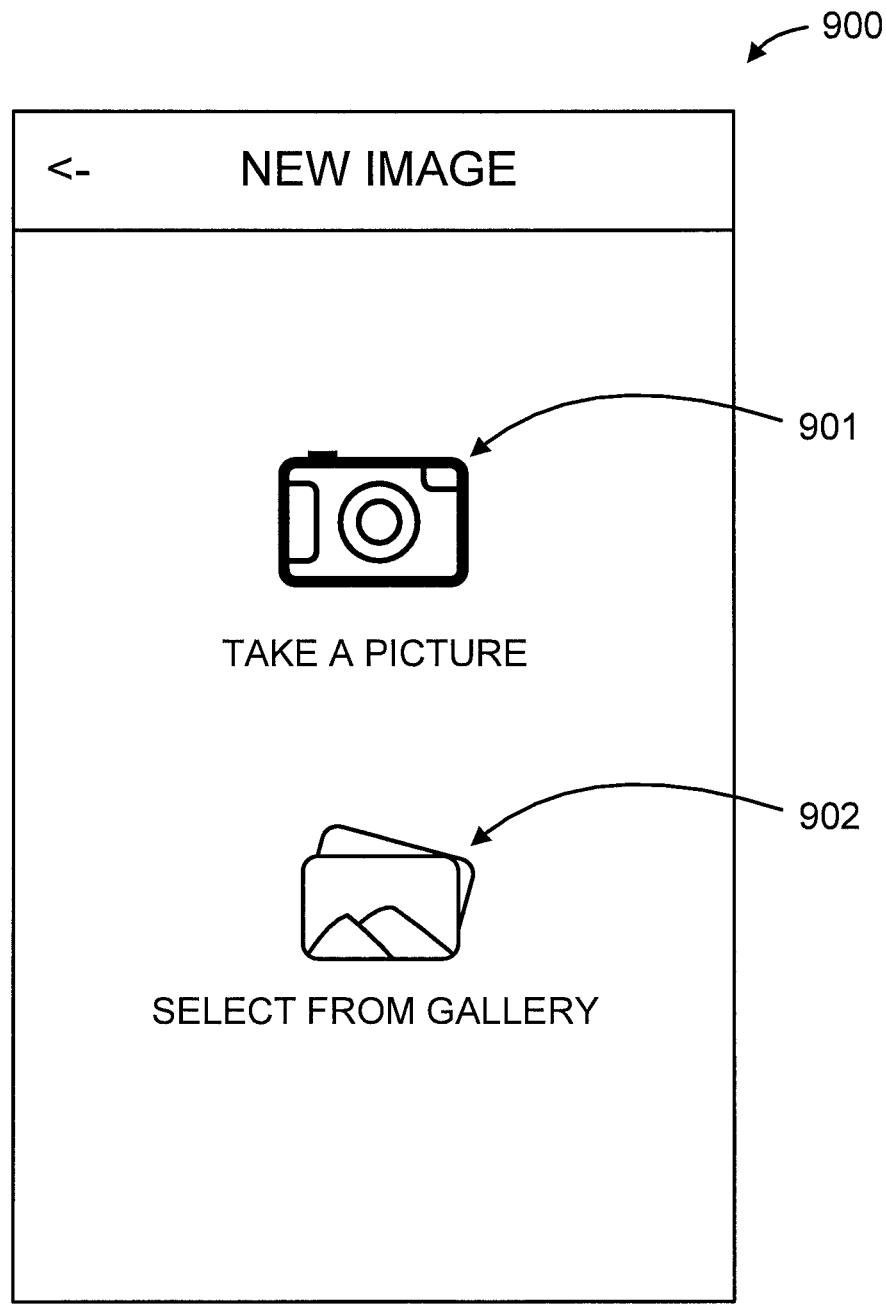
FIG. 9 is an exemplary screenshot of a screen of a NFC device showing recording options for recording an image once the camera icon shown in FIG. 7 has been selected, in accordance with an embodiment of the present invention.

FIG. 9 is an exemplary screenshot 900 of a screen of a NFC device showing recording options for recording an image once the camera icon shown in FIG. 7 has been selected, in accordance with an embodiment of the present invention. The recording options include a "take a picture" option 901 and a "select from gallery" option 902.

Referring back to the example, in an embodiment, the second owner can be a retailer.

For example, consider the case where a retailer named "Dave Jewelers" buys the NFC gem from the manufacturer.

The second owner Dave taps the NFC gem to access to the messages. The message library will be open and capable of saving messages to the gem's library in Dave's device. These new messages now belong to (that is, are accessible to) the second user of the application but Dave is not the owner of the NFC gem yet. This message from the first owner is still owned by the first owner. This mean the first and second owners own the same copy of these messages. However, the registration of the NFC gem still belongs to the first owner. Thus, the first owner is still the owner of this gem on the cloud, even though he is no longer has the physical gem.

In such a scenario, the question is "How do we determine the new owner of the gem without require the next owner of the gem to apply or register for new ownership of the gem?

To own the gem on the cloud, the second owner needs to write a new recording to the NFC gem to claim ownership of the gem. After, the recording is successfully sent to the operating system, then the server automatically assigns this NFC gem and its contents to the new owner that made the last recording to the NFC gem. In conclusion, the user that made the last recording or writing to the NFC gem is the new owner of the NFC gem without having to manually register in order to become the owner of the NFC gem and its contents.

Figure 10:
FIG. 10 is an exemplary screenshot of a screen of a NFC device showing various gem names and recording statuses of recordings of corresponding gems, in accordance with an embodiment of the present invention.

FIG. 10 is an exemplary screenshot 1000 of a screen of a NFC device showing various gem names and recording statuses of recordings of corresponding gems, in accordance with an embodiment of the present invention. In FIG. 10, a star icon indicates the last recording for a given gem, a music note icon indicates an audio recording, and a camera icon indicates a visual recording (e.g., a photo or a video). Of course, other icons can be used. In an embodiment, multiple recordings can be stored for a given gem in a gem folder, but only the entries having the star icon will be played back upon opening the application and tapping the gem to the NFC device. In an embodiment, more than one recording having a star icon can be selected for playback and/or sharing with other users. Hence, in such an embodiment, when a gem is tapped to the NFC device, all the recordings having highlighted star icons can be played back. The message will play back for the gem owner if the gem owner taps his NFC device to the gem. If another user taps the gem with their NFC device, then (all of) the highlighted messages can be copied to the NFC device of the other user.

A description will now be given regarding an exemplary scenario to which the present invention can be applied.

In particular, the scenario relates to what can be referred to as a "Daily Bible". For example, a NFC jewelry holds a complete bible but delivers a daily verse. We call this a Daily Bible.

In an embodiment, the NFC jewelry can be in the form of a Cross (or some other form) having a NFC gem that can play back audio and video daily. The Bible has pages and verses that can be over whelming for a person to learn in a day or even a month. Hence, a process would be beneficial that allows delivering a small amount of content daily to the Daily Bible Jewelry.

In an embodiment, the following can be involved. The application (Momento®) can be used to create an internal link (to a library) that is called Bible Jewelry. In a Bible Jewelry library, we can have a Jesus Film, Daily Audio Bible, The Bible. FIG. 11 is an exemplary screenshot 1100 of a screen of a NFC device showing options for reproducing a Jesus Film, Daily Audio Bible, and The Bible, in accordance with an embodiment of the present invention. A play button 1101 can be actuated by a user to commence playback of the Jesus Film and/or can be commenced when the NFC gem is tapped against the NFC device, depending upon the particular configuration.

Figure 12:
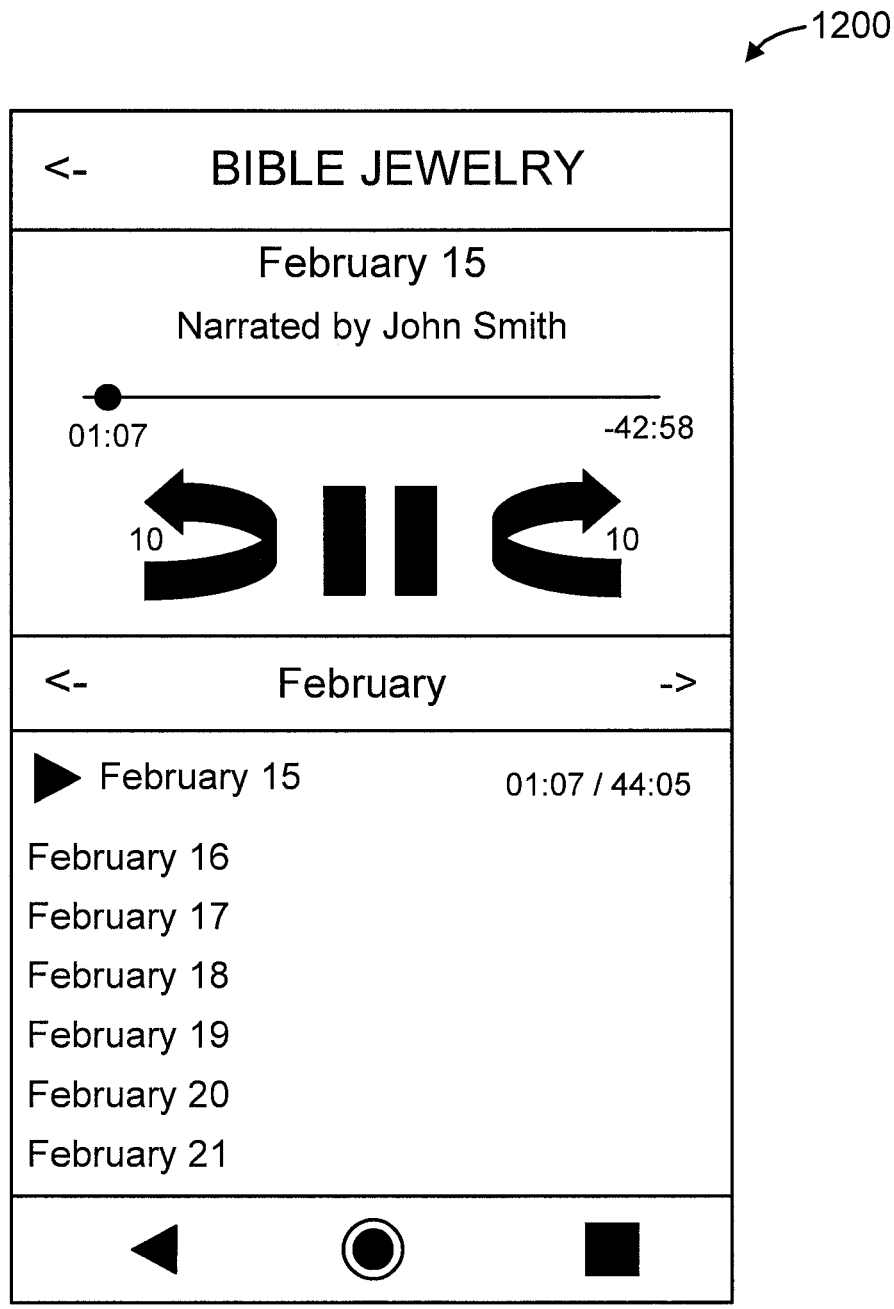
FIG. 12 is an exemplary screenshot of a screen of a NFC device showing various days for playing back the Daily Audio Bible shown in FIG. 11, in accordance with an embodiment of the present invention.

FIG. 12 is an exemplary screenshot 1200 of a screen of a NFC device showing various days for playing back the Daily Audio Bible shown in FIG. 11, in accordance with an embodiment of the present invention. The Daily Audio Bible can play audio 365 days, one day at a time, each time a user taps their device to their NFC gem, and the NFC gem will play a different message/portion. The messages are organized on the server and sent to the NFC device (e.g., phone) when the user's device is tapped to the NFC gem or the daily Mass Reading cycle can be sent over the course of 3 years in accordance with the Catholic Church. Various control buttons are provided for playing, pausing, recording, stopping, rewinding, fast forwarding, and so forth.

Figure 13:
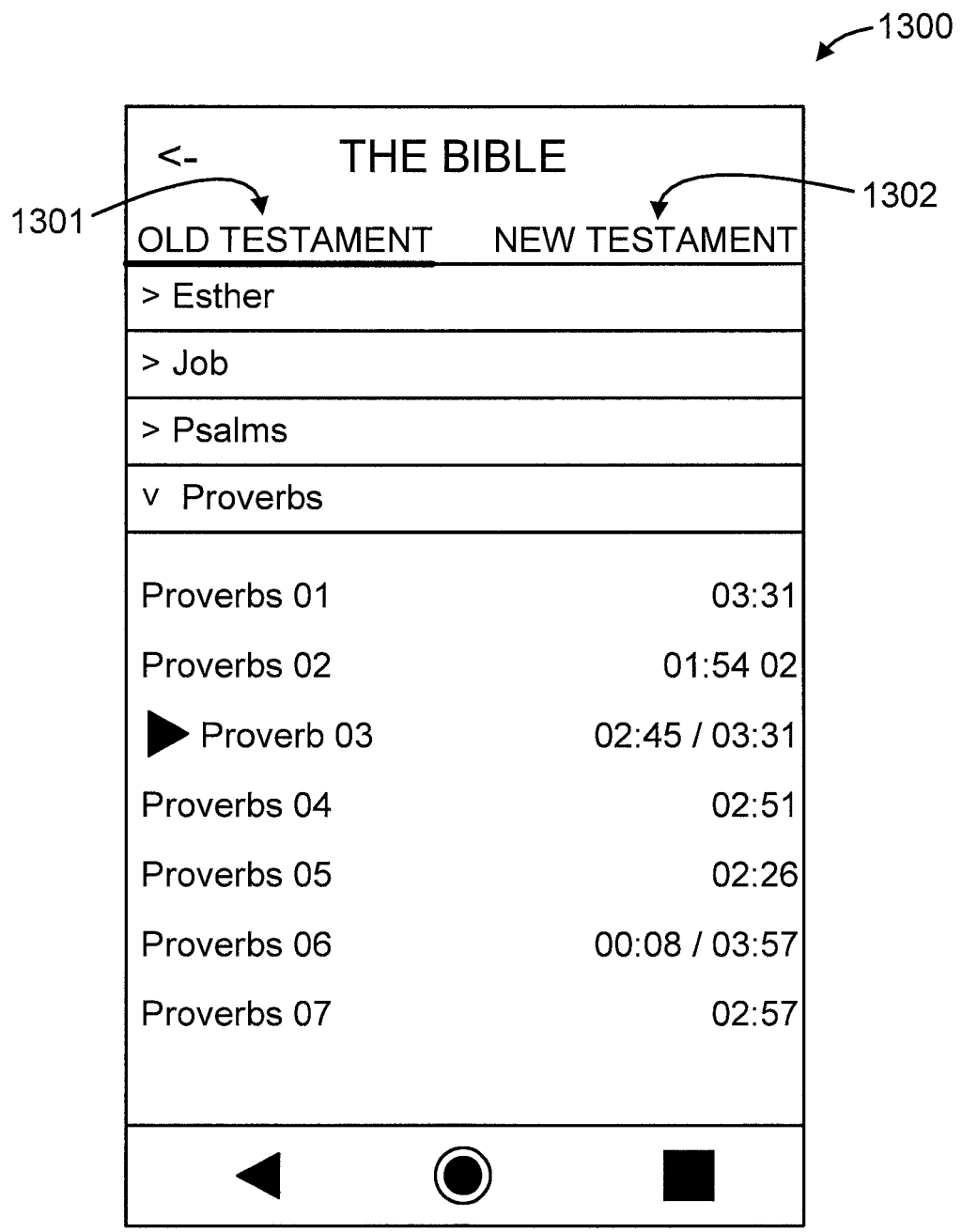
FIG. 13 is an exemplary screenshot of a screen of a NFC device showing options for The Bible option of FIG. 11, in accordance with an embodiment of the present invention.
Figure 14:
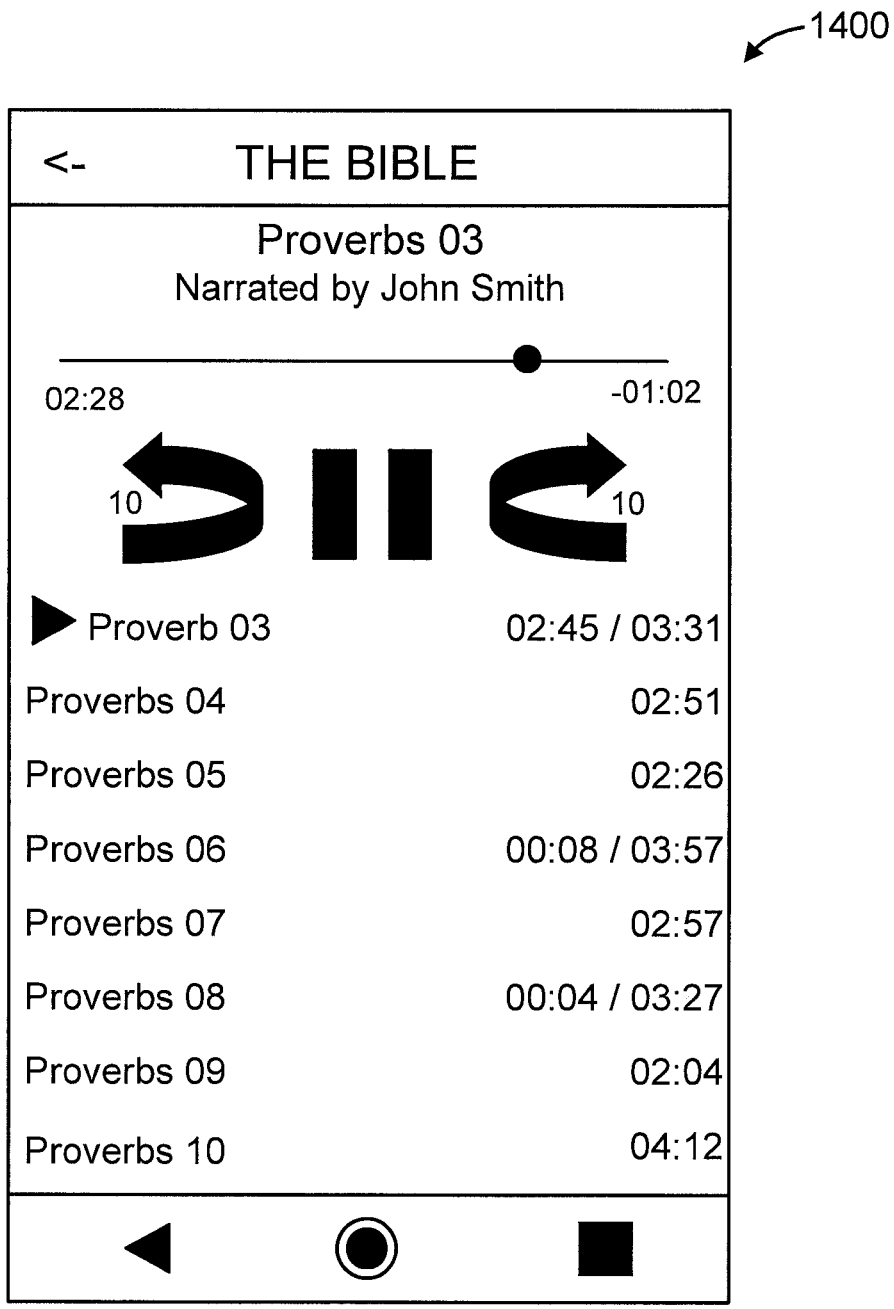
FIG. 14 is an exemplary screenshot of a screen of a NFC device showing a selection screen for selecting and playing back proverbs, in accordance with an embodiment of the present invention.

FIG. 13 is an exemplary screenshot 1300 of a screen of a NFC device showing options for The Bible option of FIG. 11, in accordance with an embodiment of the present invention. The options include an Old Testament option 1301 and a New Testament option 1302. The Old Testament option 1301 can include further options as shown including, for example, Esther, Job, Psalms, and Proverbs. FIG. 14 is an exemplary screenshot 1400 of a screen of a NFC device showing a selection screen for selecting and playing back proverbs, in accordance with an embodiment of the present invention.

Such an application is not limited to only the bible, and can be used for other religions, for other books, poems, inspirations, manuals, or basically any media. In this way, a user can benefit in a myriad of ways such as enlightenment, learning, being calmed, obtaining certain information, and/or so forth, as readily appreciated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for performing Near Field Communication (NFC) communication with a NFC device that includes a NFC writable component and an operating system that is manufactured without a capability of writing to the NFC writable component and allows reading Near Field Communication Data Exchange Format (NDEF) messages from a source other than the NFC writable component, the method comprising:
   receiving, by a remote server, a serial number of the NFC writable component;
   generating, by the remote server, a permanent unique ID for the NFC writable component based on the serial number of the NFC writable component;
   storing, by the remote server, the permanent unique ID for the NFC writable component with a name of the NFC writable component; and
   preparing and sending, by the remote server, a NDEF message to the NFC device that includes the permanent unique ID together with information to be shared with a user of the NFC device.

2. The computer-implemented method of claim 1, wherein the NFC writable component is a Near Field Communication Data Exchange Format tag.

3. The computer-implemented method of claim 1, wherein the NFC writable component is a NFC chip.

4. The computer-implemented method of claim 1, wherein the NFC device is a gem.

5. The computer-implemented method of claim 1, wherein the method is performed as a registration process to register an owner of the NFC device that includes the NFC writable component.

6. The computer-implemented method of claim 1, further comprising:
   reading, by another NFC device, the serial number of the NFC writable component; and
   sending, by the other NFC device, the serial number to the remote server,
   wherein the other NFC device has an operating system that permits writing to the NFC writable component.

7. The computer-implemented method of claim 1, wherein said generating step comprises applying a hash function to the serial number to generate the unique ID.

8. A non-transitory article of manufacture tangibly embodying a computer readable program which when executed causes a computer to perform the steps of claim 1.

9. A system for performing Near Field Communication (NFC) communication with a NFC device that includes a NFC writable component and an operating system that is manufactured without a capability of writing to the NFC writable component and allows reading Near Field Communication Data Exchange Format (NDEF) messages from a source other than the NFC writable component, the system comprising:
  a remote server configured to
    receive, a serial number of the NFC writable component;
    generate a permanent unique ID for the NFC writable component based on the serial number of the NFC writable component;
    store the permanent unique ID for the NFC writable component with a name of the NFC writable component; and
    prepare and send a NDEF message to the NFC device that includes the permanent unique ID together with information to be shared with a user of the NFC device.

10. The system of claim 9, wherein the remote server is cloud based.

11. The system of claim 9, further comprising another NFC device that includes an operating system capable of reading from the NFC writable component, wherein the other NFC device is configured to read the serial number of the NFC writable component and send the serial number to the remote server.

12. A computer-implemented method for performing Near Field Communication (NFC) with a NFC device that includes a NFC writable component and an operating system that is manufactured without a capability of writing to the NFC writable component and allows reading Near Field Communication Data Exchange Format (NDEF) messages from a source other than the NFC writable component, the method comprising:
  receiving, by a remote server, a serial number of the NFC writable component;
  generating, by the remote server, a permanent unique ID for the NFC writable component based on the serial number of the NFC writable component;
  storing, by the remote server, the generated permanent unique ID for the NFC writable component with a name of the NFC writable component;
  preparing and sending, by the remote server to the NFC device, an NDEF message that includes the permanent unique ID; and
  selectively storing to or retrieving from, the remote server, data using the permanent unique ID included in the NDEF message as an index for data storage or data retrieval, respectively.

13. The computer-implemented method of claim 12, wherein the NFC writable component is a Near Field Communication Data Exchange Format tag.

14. The computer-implemented method of claim 12, wherein the NFC writable component is a NFC chip.

15. The computer-implemented method of claim 12, wherein the NFC device is a gem.

16. The computer-implemented method of claim 12, wherein said generating step comprises applying a hash function to the serial number to generate the permanent unique ID.

17. The computer-implemented method of claim 12, further comprising reading, by another NFC device that includes an operating system capable of reading from the NFC writable component, the serial number of the NFC writable component.

18. The computer-implemented method of claim 12, wherein said selectively storing or retrieving step comprises selectively retrieving portions of the data at certain time periods until an entirety of the data has been retrieved.

19. The computer-implemented method of claim 12, wherein said selectively storing or retrieving step comprises determining ownership of the NFC device based on based on data writing order.

20. The computer-implemented method of claim 19, wherein said selectively storing or retrieving step further comprises selectively storing the data or other data by multiple NFC devices, wherein a user of a last used one of the multiple NFC devices storing the data or the other data is designated as an owner of the NFC device.

21. The computer-implemented method of claim 12, wherein the data is at least a portion of a book.

22. The computer-implemented method of claim 12, wherein the data comprises acoustic data.

23. A system for performing Near Field Communication (NFC) with a NFC device that includes a NFC writable component and an operating system that is manufactured without a capability of writing to the NFC writable component and allows reading Near Field Communication Data Exchange Format (NDEF) messages from a source other than the NFC writable component, the system comprising:
  a remote server configured to
    receive a serial number of the NFC writable component;
    generate a permanent unique ID for the NFC writable component based on the serial number of the NFC writable component;
    store the generated permanent unique ID for the NFC writable component with a name of the NFC writable component;
    prepare and send, to the NFC device, an NDEF message that includes the permanent unique ID; and
    selectively store or retrieve data using the permanent unique ID included in the NDEF message as an index for data storage or data retrieval, respectively.

24. The system of claim 23, wherein the remote server is cloud based.

25. The system of claim 23, further comprising another NFC device that includes an operating system capable of reading from the NFC writable component, wherein the other NFC device is configured to read the serial number of the NFC writable component and send the serial number to the remote server.

* * * * *